(12) United States Patent
Schultz et al.

(10) Patent No.: US 10,465,813 B2
(45) Date of Patent: Nov. 5, 2019

(54) HOUSING FOR A SHUT-OFF VALVE

(71) Applicant: VAG—Armaturen GmbH, Mannheim (DE)

(72) Inventors: Carl Schultz, New Berlin, WI (US); Heribert Herold, Mannheim (DE)

(73) Assignee: VAG—ARMATUREN GMBH, Mannheim (DE)

( * ) Notice: Subject to any disclaimer, the term of this patent is extended or adjusted under 35 U.S.C. 154(b) by 160 days.

(21) Appl. No.: 15/297,273

(22) Filed: Oct. 19, 2016

(65) Prior Publication Data
US 2017/0114917 A1    Apr. 27, 2017

(30) Foreign Application Priority Data

Oct. 22, 2015  (DE) .......................... 10 2015 118 001

(51) Int. Cl.
| F16K 27/02 | (2006.01) |
| F16K 27/10 | (2006.01) |
| F16K 1/22  | (2006.01) |
| F15D 1/00  | (2006.01) |

(52) U.S. Cl.
CPC ............ F16K 27/0218 (2013.01); F16K 1/22 (2013.01); F16K 27/102 (2013.01); F15D 1/00 (2013.01)

(58) Field of Classification Search
CPC ...... F16K 27/0218; F16K 27/102; F16K 1/22; F15D 1/00
USPC .......................................................... 251/366
See application file for complete search history.

(56) References Cited

U.S. PATENT DOCUMENTS

| 3,420,500 A | * | 1/1969 | Geiselman | .............. F16K 1/226 |
| | | | | 192/141 |
| 3,525,499 A | * | 8/1970 | Geiselman | .............. F16K 1/226 |
| | | | | 251/306 |
| 3,905,577 A | * | 9/1975 | Karpenko | ............. F16K 1/2261 |
| | | | | 251/306 |
| 4,082,246 A | * | 4/1978 | Rothwell | .............. F16K 1/2261 |
| | | | | 251/307 |
| 4,285,498 A | | 8/1981 | Nightingale | |
| 4,340,549 A | * | 7/1982 | McKim | .................... F02M 7/22 |
| | | | | 123/25 K |
| 4,480,815 A | * | 11/1984 | Kreij | ....................... F16K 1/226 |
| | | | | 251/298 |
| 4,607,822 A | * | 8/1986 | Schabert | ................... F16K 1/34 |
| | | | | 251/118 |

FOREIGN PATENT DOCUMENTS

| DE | 2722036 C2 | 4/1982 | |
| DE | 19600567 A1 | * 3/1997 | .............. F02D 9/06 |

(Continued)

OTHER PUBLICATIONS

Result of examination report for German Patent Application No. 10 2015 118 001.4 filed Oct. 22, 2015, 1 page.

*Primary Examiner* — Marina A Tietjen
(74) *Attorney, Agent, or Firm* — Paul D. Bianco; Katherine Davis; Fleit Gibbons Gutman Bongini & Bianco PL

(57) ABSTRACT

A shut-off valve housing having a through-channel extending inside a main body between an inlet opening and an outlet opening, and a valve seat disposed inside the through-channel. To reduce flow losses, an outflow region of the through-channel immediately downstream of the valve seat on an outflow side has an inwardly curved contour.

20 Claims, 2 Drawing Sheets

(56) References Cited

FOREIGN PATENT DOCUMENTS

| EP | 0124821 | A1 | | 11/1984 | |
|---|---|---|---|---|---|
| EP | 1757851 | A2 | * | 2/2007 | ............... F16K 1/22 |
| EP | 2017510 | A1 | * | 1/2009 | |
| FR | 2606115 | A1 | * | 5/1988 | ............... F02D 9/10 |

* cited by examiner

HOUSING FOR A SHUT-OFF VALVE

FIELD OF THE INVENTION

The present invention relates to a shut-off valve housing.

BACKGROUND

Shut-off valves are shut-off devices widely used in water resources engineering. They are frequently designed as butterfly valves with a flap- or disk-shaped valve body, which is pivotably mounted about an axis of rotation inside a shut-off valve housing and which can be swiveled between a closed position and an open position. As a rule, the shut-off valve housings of this type of shut-off devices comprise a main body made of metal and having a valve seat disposed inside a through-channel of the main body, against which valve seat the flap-or disk-shaped valve body, when in the closed position, rests by way of a gasket. To keep the flow losses in the shut-off valves in the open position as low as possible, the valve body, as well as the through-channel of the associated shut-off valve housing, should be designed so as to promote the flow of the fluid as efficiently as possible. Calculations have shown that the fluid flow promoting design of the valve seat has a significant influence on the flow resistance of the shut-off valve. To ensure that the medium flowing through the through-channel in the open position of the shut-off valve is able to impinge on the housing wall of the shut-off valve housing with the lowest possible flow resistance after having passed the flow-inhibiting and medium-accelerating valve seat, the through-channel in the prior-art shut-off valve housings in many cases undergoes a conical or abrupt expansion of the cross section on the outflow side of the valve seat. However, from the standpoint of fluid technology, this type of through-channel design leaves much to be desired.

SUMMARY OF THE INVENTION

A shut-off valve housing of the type mentioned above which makes it possible to reduce flow losses is disclosed.

Useful embodiments and further advanced modifications are also disclosed.

In the shut-off valve housing according to the present invention, an outflow region of the through-channel immediately downstream of the valve seat on the outflow side has an inwardly curved contour. This allows the flow of the medium, which is accelerated by the valve seat, to impinge with the lowest possible resistance on the inside wall of the main body, thereby reducing the flow resistance. With the shut-off valve housing according to the present invention, it is possible to ensure a stable flow path without stall in the region of the valve seat and without back flows downstream of the valve seat.

In an especially useful embodiment, the curvature in the outflow region of the through-channel is designed so as to ensure that the transition from the valve seat to the outflow region extends parallel to, or at an angle of ≤10° relative to, the central axis of the through-channel and, thus, as parallel as possible relative to the direction of flow. This makes it possible to attain a flow path that is as disturbance-free as possible.

According to another useful embodiment of the present invention, the inwardly curved outflow region of the through-channel extends at a radius of curvature R1, with the product of the radius R1 and the quotient of the nominal diameter DN of the valve housing and the inside diameter Di at a narrowest point of the through-channel preferable having a value between 150 and 400. The outflow region is preferably designed in such a manner that, in the transition region to the valve seat, it extends tangentially with respect to the seat plane of the valve seat.

According to an embodiment which, from the standpoint of fluid technology, offers special advantages, the outflow region of the through-channel with the inwardly curved contour which, in the direction of flow, is disposed immediately downstream of the valve seat is adjoined by a further region of the through-channel with an outwardly curved contour so that the through-channel of the shut-off valve housing on the outflow side of the valve seat overall has an S-shaped contour. This region extends at a radius R2, with the product of the radius R2 and the quotient of the nominal diameter DN of the valve housing and the inside diameter Di at the narrowest point of the through-channel preferably having a value between 150 and 400.

According to another embodiment which is useful from the standpoint of flow control, an inflow region of the through-channel, which is disposed on the inflow side of the valve seat, can have an outwardly curved contour.

On the inside surface, the main body of the shut-off valve housing, which has the shape of a hollow cylinder, can have a recess that serves as a welding bed for receiving a material for the valve seat, which material is applied by means of deposition welding. The recess can be disposed on the inside surface of a protuberance projecting inwardly from the main body and can have the shape of a planar annular groove.

BRIEF DESCRIPTION OF THE DRAWINGS

Additional features and advantages of the present invention follow from the subsequent description of a practical example with reference to the drawings. The drawings show.

DETAILED DESCRIPTION

Figure 1:
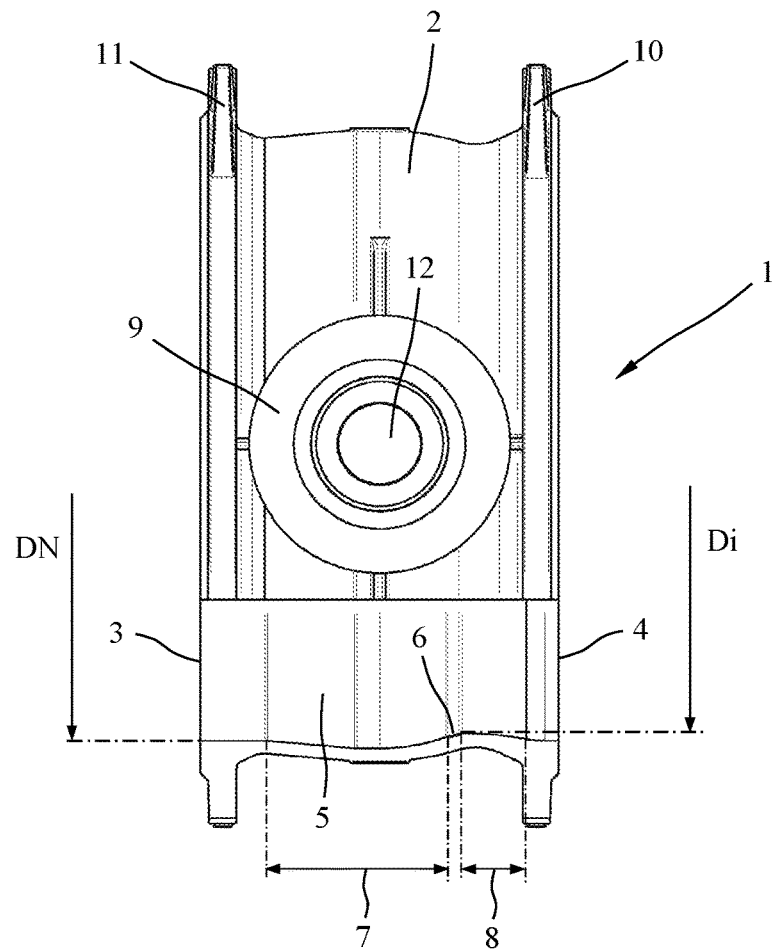
FIG. 1 a partially sectioned view of a shut-off valve housing.

FIG. 1 shows a partially sectioned lateral view of a shut-off valve housing 1 of a shut-off valve, which is configured in the form of a butterfly valve and used as a shut-off valve in water pipes. The shut-off valve housing 1 comprises a through-channel 5, which extends inside a main body 2 between in inlet opening 3 and an outlet opening 4, and a valve seat 6 disposed inside the through-channel 5. The through-channel 5, which has a circular cross section, comprises an inflow region 7 disposed upstream of the valve seat 6 and an outflow region 8 immediately downstream of the valve seat 6 on the outflow side.

Figure 2:
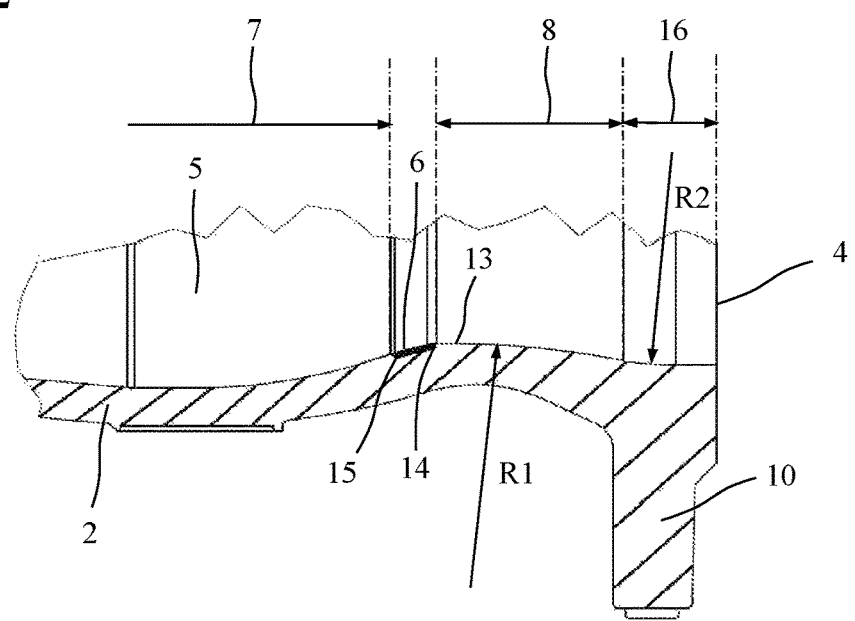
FIG. 2 a detail view of the shut-off valve housing shown in FIG. 1.

The shut-off valve housing 1, which is made of cast iron, another metal, or a plastic material, comprises a lateral bearing flange 9 for the rotary support of a flap- or disk-shaped valve body (not shown) and connecting flanges 10 and 11 on both ends for connecting the housing to pipelines. Disposed in the lateral bearing flange 3 is a bearing bore 12, which extends at right angles with respect to the longitudinal axis of the main body 2, for a drive shaft of the valve body, which is capable of being rotated between a closed position and an open position. The valve seat 6 is a hard-faced valve seat and can be produced with a weld overlay made, e.g., from stainless steel (chromium-nickel alloy). To this end, in the region of the valve seat 6, as shown in FIG. 2, the inside wall 13 of the main body 2 can have a protuberance 14 projecting inwardly into the through-channel 5 and having a recess 15 in the shape of an annular groove disposed on the inside surface for receiving the material which is applied by means of deposition welding.

As indicated especially in FIG. 2, the inflow region 7 of the through-channel 5 which, as seen in the direction of flow, is disposed upstream of the valve seat 6 first has a continuously increasing diameter and subsequently, up to the valve seat 6, a continuously decreasing diameter. Thus, as seen in the radial direction, the through-channel 5 has an inflow region 7 with an outwardly curved contour, i.e., curved towards the outside surface of the main body 2. In contrast, the outflow region 8 of the through-channel 5, which is disposed immediately downstream of the valve seat 6 on the outflow side, has a radially inwardly curved contour, i.e., curved towards the central axis of the through-channel 5. The inwardly curved outflow region 8 of the through-channel 5 extends at a radius of curvature R1, which is preferably selected in such a manner that the product (R1× DN/Di), i.e., the product of this radius R1 and the discharge coefficient, i.e., the quotient of a nominal diameter DN of the valve housing and an inside diameter Di at the narrowest point of the through-channel 5, has a value between 150 and 400. The curvature in the outflow region 8 of the through-channel 5 is designed in such a manner that the transition from the valve seat 6 to the outflow region 8 extends as parallel as possible to the central axis of the through-channel 5 and, thus, as parallel as possible to the direction of flow. This makes it possible to attain a flow path that is as disturbance-free as possible.

The outflow region 8 of the through-channel 5 with the inwardly curved contour which, in the direction of flow, is disposed immediately downstream of the valve seat 6, is adjoined by a further outwardly curved region 16 of the through-channel 5 so that the through-channel 5 of the shut-off valve housing 1 on the outflow side of the valve seat 6 overall has an S-shaped contour. The radius R2 of the region 13 is preferably selected to ensure that the product (R2×DN/Di), i.e., the product of this radius R2 and the discharge coefficient, i.e., the quotient of the nominal diameter DN of the valve housing 1 and the inside diameter Di at the narrowest point of the through-channel 5, has a value between 150 and 400.

Figure 3:
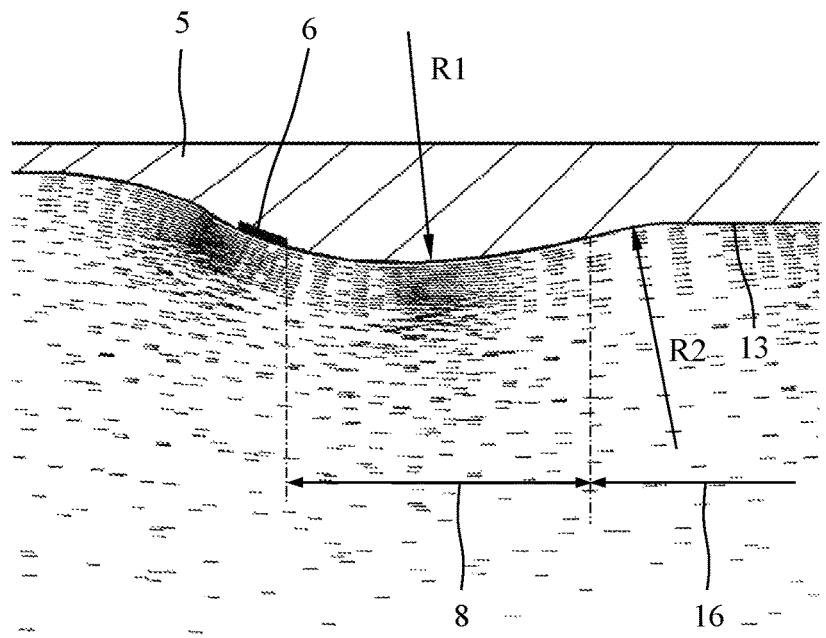
FIG. 3 a diagrammatic visualization of the flow inside a shut-off valve housing according to the present invention; and, FIG. 4 a diagrammatic visualization of the flow inside a prior-art shut-off valve housing.

As the flow visualization of FIG. 3 indicates, when the outflow region 8 has an inwardly curved contour, the flow on the outflow side of the valve seat 6 proceeds relatively free from disturbances and without the formation of back flows along the inside wall 13 of the main body 2.

Figure 4:
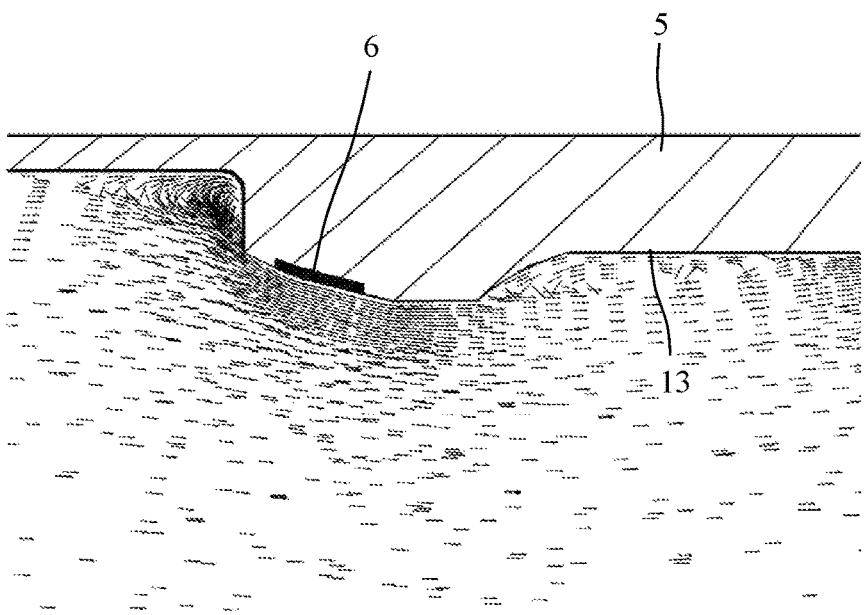

In contrast, the flow visualization of FIG. 4 indicates that, along the inside wall 13 of the main body 2, back flows and turbulences form on the outflow side of the valve seat 6 when the outflow region has an outwardly curved contour, i.e., curved toward the outside surface of the housing 2.

What is claimed is:

1. A housing for a shut-off valve comprising:
   a main body;
   a through-channel extending inside the main body between an inlet opening at one end of a central longitudinal axis of the through-channel and an outlet opening on another end of the central longitudinal axis of the through-channel; and
   a valve seat arranged inside the through-channel between the inlet opening and the outlet opening;
   wherein an outflow region of the through-channel immediately downstream of the valve seat has a convex, inwardly curved contour adjoined to a further region of the through-channel having a concave, outwardly curved contour such that the through-channel, on an outflow side of the shut-off valve housing, has an S-shaped contour.

2. The housing according to claim 1, wherein arrangement of the outflow region enables reduction of flow loss.

3. The housing according to claim 1, wherein the convex, inwardly curved contour of the outflow region extends at a radius of curvature R1 and a product of radius R1 and a quotient of nominal diameter DN of the housing and an inside diameter Di at a narrowest point of the through-channel has a value between 140 and 400.

4. The housing according to claim 1, wherein the outflow region of the through-channel extends tangentially with respect to a seat plane of the valve seat.

5. The housing according to claim 1, wherein the concave, outwardly curved contour of the outflow region extends at a radius of curvature R2 and a product of radius R2 and a quotient of nominal diameter DN of the housing and an inside diameter Di at a narrowest point of the through-channel has a value between 140 and 400.

6. The housing according to claim 1, wherein the through-channel further comprises an inflow region upstream of the valve seat, the inflow region having a concave, outwardly curved contour.

7. The housing according to claim 1, further comprising a recess in an inside wall of the main body, the recess positioned for receiving material for the valve seat.

8. The housing according to claim 7, wherein the recess is disposed on an inside surface of a protuberance projecting inwardly from the main body.

9. The housing according to claim 7, wherein the recess is shaped as a planar, annular groove.

10. A housing for a shut-off valve comprising:
    a main body;
    a through-channel extending inside the main body between an inlet opening at one end of a central longitudinal axis of the through-channel and an outlet opening on another end of the central longitudinal axis of the through-channel; and
    a valve seat arranged inside the through-channel between the inlet opening and the outlet opening;
    wherein an inflow region of the through-channel upstream of the valve seat has a concave, outwardly curved contour; and
    wherein an outflow region of the through-channel immediately downstream of the valve seat has a convex, inwardly curved contour adjoined to a further region of the through-channel having a concave, outwardly curved contour such that the through-channel, on an outflow side of the shut-off valve housing, has an S-shaped contour.

11. The housing according to claim 10, wherein arrangement of the outflow region enables reduction of flow loss.

12. The housing according to claim 10, wherein the convex, inwardly curved contour of the outflow region extends at a radius of curvature R1 and a product of radius R1 and a quotient of nominal diameter DN of the housing and an inside diameter Di at a narrowest point of the through-channel has a value between 140 and 400; and
    wherein the concave, outwardly curved contour of the outflow region extends at a radius of curvature R2 and a product of radius R2 and a quotient of nominal diameter DN of the housing and an inside diameter Di at a narrowest point of the through-channel has a value between 140 and 400.

13. The housing according to claim 10, further comprising a recess in an inside wall of the main body, the recess positioned for receiving material for the valve seat.

14. A housing for a shut-off valve comprising:
a main body;
a through-channel extending inside the main body between an inlet opening at one end of a central longitudinal axis of the through-channel and an outlet opening on another end of the central longitudinal axis of the through-channel; and
a valve seat arranged inside the through-channel between the inlet opening and the outlet opening;
wherein an outflow region of the through-channel immediately downstream of the valve seat has a convex, inwardly curved contour adjoined to a further region of the through-channel having a concave, outwardly curved contour such that the through-channel, on an outflow side of the shut-off valve housing, has an S-shaped contour;
wherein the convex, inwardly curved contour of the outflow region extends at a radius of curvature R1 and a product of radius R1 and a quotient of nominal diameter DN of the housing and an inside diameter Di at a narrowest point of the through-channel has a value between 140 and 400; and
wherein the concave, outwardly curved contour of the outflow region extends at a radius of curvature R2 and a product of radius R2 and a quotient of nominal diameter DN of the housing and an inside diameter Di at a narrowest point of the through-channel has a value between 140 and 400.

15. The housing according to claim 14, wherein arrangement of the outflow region enables reduction of flow loss.

16. The housing according to claim 14, wherein the outflow region of the through-channel extends tangentially with respect to a seat plane of the valve seat.

17. The housing according to claim 14, wherein the through-channel further comprises an inflow region upstream of the valve seat, the inflow region having a concave, outwardly curved contour.

18. The housing according to claim 14, further comprising a recess in an inside wall of the main body, the recess positioned for receiving material for the valve seat.

19. The housing according to claim 18, wherein the recess is disposed on an inside surface of a protuberance projecting inwardly from the main body.

20. The housing according to claim 18, wherein the recess is shaped as a planar, annular groove.

* * * * *